United States Patent
Lopez (10) Patent No.: US 7,990,307 B1
(45) Date of Patent: Aug. 2, 2011

(54) INTEGRITY MONITOR ANTENNA SYSTEMS FOR GPS-BASED PRECISION LANDING SYSTEM VERIFICATION

(75) Inventor: Alfred R. Lopez, Commack, NY (US)

(73) Assignee: BAE Systems Information and Electronic Systems Integration Inc., Greenlawn, NY (US)

( * ) Notice: Subject to any disclaimer, the term of this patent is extended or adjusted under 35 U.S.C. 154(b) by 27 days.

(21) Appl. No.: 12/583,636

(22) Filed: Aug. 24, 2009

(51) Int. Cl.
*G01S 19/22* (2010.01)
*H04B 1/10* (2006.01)

(52) U.S. Cl. .......... 342/4; 342/357.53; 342/357.61; 342/363; 455/288

(58) Field of Classification Search .......... 342/1, 2, 342/4, 33–35, 39, 357.52, 357.53, 357.59, 342/357.61, 363–366, 379; 343/841, 846; 455/271, 278.1, 283, 288; *G01S 19/15, 19/22; H04B 1/10, 1/12, 15/00, 15/02; H01Q 1/48, H01Q 17/00*
See application file for complete search history.

(56) References Cited

U.S. PATENT DOCUMENTS

| | | | |
|---|---|---|---|
| 4,283,725 A | | 8/1981 | Chisholm |
| 5,534,882 A * | | 7/1996 | Lopez ............... 343/891 |
| 5,793,329 A * | | 8/1998 | Nakada et al. ........... 342/357.53 |
| 6,201,510 B1 | | 3/2001 | Lopez et al. |
| 6,597,316 B2 * | | 7/2003 | Rao et al. ............... 343/700 MS |
| 7,009,106 B2 * | | 3/2006 | DiPoala ........................ 174/377 |
| 7,652,623 B2 * | | 1/2010 | Oomuro ........................ 342/360 |
| 2005/0024267 A1 * | | 2/2005 | Jouvie et al. ........... 343/700 MS |
| 2005/0277441 A1 | | 12/2005 | Lastinger et al. |
| 2006/0255998 A1 * | | 11/2006 | Hirata et al. ...................... 342/1 |
| 2007/0236385 A1 * | | 10/2007 | Kleman et al. ................ 342/124 |
| 2008/0074322 A1 | | 3/2008 | Ryba |
| 2008/0102814 A1 | | 5/2008 | Chari et al. |

* cited by examiner

*Primary Examiner* — Thomas H Tarcza
*Assistant Examiner* — John B Vigushin
(74) *Attorney, Agent, or Firm* — Kenneth P. Robinson (57) ABSTRACT

The integrity of operation of a GPS precision aircraft approach and landing system may be compromised by error producing effects of reflected multipath signals. An integrity monitor antenna system as disclosed may utilize both attenuation and shadowing of reflected multipath GPS signals to achieve extreme multipath mitigation of the order of 50 dB suppression. An antenna with a right-hand circular polarization pattern having a sharp cut off at the horizon may provide 30 dB suppression of reflected multipath signals. A signal absorbent ground plane bed of defined dimensions may provide 20 dB attenuation of incident multipath signals. A signal/processor may be employed to derive position error data for integrity monitoring, based upon differentials between a known fixed location and a current GPS-indicated location. Communication of identification of a subset of particular GPS satellites for common usage may also reduce potential error levels.

20 Claims, 5 Drawing Sheets

INTEGRITY MONITOR ANTENNA SYSTEMS FOR GPS-BASED PRECISION LANDING SYSTEM VERIFICATION

STATEMENT OF GOVERNMENT INTEREST

The invention claimed in this patent application was made with U.S. Government support wider contract No. DTFACT-04-C-0017 awarded by the Federal Aviation Administration (FAA). The U.S. Government has certain rights in the invention.

RELATED APPLICATIONS (Not Applicable)

FEDERALLY SPONSORED RESEARCH (Not Applicable)

BACKGROUND OF THE INVENTION

This invention relates to antenna systems to receive signals from Global Positioning System (GPS) satellites and, more particularly, to antenna systems capable of highly accurately determining errors in a current GPS-indicated position of a fixed location of known latitude, longitude and elevation.

Implementation of GPS-based precision aircraft approach and landing systems necessitates provision for currently verifying the integrity of the system. Particularly for systems capable of enabling aircraft landings at airports under zero visibility atmospheric conditions, small errors in the GPS-indicated position of an aircraft relative to the runway surface may be critical to the accomplishment of a safe landing. Variations in the integrity of a GPS-indicated position are inherent due to variations and errors which may occur in the transmission of the signals from GPS satellites due to atmospheric and other conditions.

Pursuant to the invention, an integrity monitor antenna system may be employed to enable derivation of error data on a current basis representing differentials between a GPS-indicated position and the actual fixed position of known latitude, longitude and altitude of the antenna system. However, it is critical that an antenna employed for this purpose be capable of receiving GPS signals without itself inherently introducing errors which may adversely affect the derivation of a GPS-indicated position by use of the received GPS signals. Thus, if the antenna itself is subject to signal reception errors, it will not be possible to accurately evaluate actual errors inherent in the GPS-indicated position developed from the received GPS signals.

In this context, antenna susceptibility to effects of reflected multipath GPS signals is of major significance. Extreme ground multipath mitigation, defined for this purpose as 40 to 50 dB suppression of reflected GPS ground signals, is desirable. Consistent with this, it is desirable that with such enhanced multipath performance the antenna employed be capable of achieving a peak multipath based error of the order of 1 cm. in altitude or lateral distance. Also of major significance is the desirability of an antenna having a unitary phase center of accurately determined position, to permit precision determinations of phase of received signals and avoid introduction of phase discrepancies. Antenna systems having the desired characteristics in this regard are described in applicant's U.S. Pat. No. 5,534,882 (the '882 patent) which is hereby incorporated herein by reference.

Antennas providing a circular polarization characteristic in all directions horizontally and upward from the horizon (i.e., omnidirectional coverage from the zenith to the horizon) with a sharp pattern cut off at the horizon are described in applicant's U.S. Pat. No. 6,201,510 (the '510 patent) which is hereby incorporated herein by reference. Antennas described in the '510 patent may be employed to provide up to 30 dB suppression of reflected GPS multipath signals.

Objects of the present invention are to provide new and improved antenna systems, including antenna systems capable of receiving GPS signals with very low susceptibility to effects of reflected ground multipath GPS signals.

SUMMARY OF THE INVENTION

In accordance with the invention, an embodiment of an integrity monitor antenna system with enhanced multipath mitigation, usable for GPS-based aircraft precision landing system verification, may include the following. An antenna which is configured to provide a right-hand circular polarization antenna pattern above a horizontal plane and having a phase center above the plane. A multipath limiting configuration which includes a bed portion positioned on the plane below the antenna and having a signal absorbent characteristic effective to provide attenuation of incident signals (e.g., 20 dB attenuation), the bed portion having a minimum dimension along the plane adequate to intersect ray paths from the phase center representative of multipath signals incident at negative elevation angles (e.g., elevation angles of minus 20 degrees or greater), and the configuration positioned at a fixed location of known latitude, longitude and altitude. A receiver/processor coupled to the antenna is configured to process received GPS signals to derive position error data representing differentials between the fixed location and a GPS-indicated location of the antenna based on signals currently received from a subset of GPS satellites. The position error data is configured to be usable to derive error levels relative to aircraft location in space determinations based on GPS signals received during landing operations.

The receiver/processor may additionally be configured to include, with the error data, identification of individual GPS satellites included in the subset of GPS satellites thus enabling consistency as to which satellites the error data is associated with.

Also in accordance with the invention, an embodiment of an integrity monitor antenna system with enhanced multipath mitigation, usable for GPS-based aircraft precision landing system verification, may include the following. An antenna, which includes a vertical array of sub-arrays each having a 360 degree progressive phase radiation characteristic, is configured to provide a right-hand circular polarization antenna pattern above a horizontal plane and having a phase center above the plane. A multipath limiting configuration includes a bed portion positioned on the plane below the antenna and has a signal absorbent characteristic effective to provide a predetermined attenuation of incident signals. The bed portion has a dimension along the plane (e.g., of nominally 20 feet) adequate to intersect a ray path from the phase center representative of multipath signals incident at negative elevation angles (e.g., elevation angles of minus 20 degrees or greater). The configuration also includes a support structure supporting the antenna and the bed portion at a height above ground surface (e.g., nominally 10 feet) adequate to provide shadowing by the bed portion of multipath reflections from surface vehicles closer than 30 feet from the antenna. The configuration is positioned at a location of known latitude, longitude and altitude. As described, the antenna system is configured to provide at least 40 dB suppression (e.g., nominally 50 dB suppression) of reflected GPS multipath signals incident upon the bed portion. For present purposes, nominally is defined as within plus or minus ten percent of a stated value.

For a better understanding of the invention, together with other and further objects, reference is made to the accompanying drawings and the scope of the invention will be addressed by the accompanying claims.

DESCRIPTION OF THE INVENTION

Figure 1:
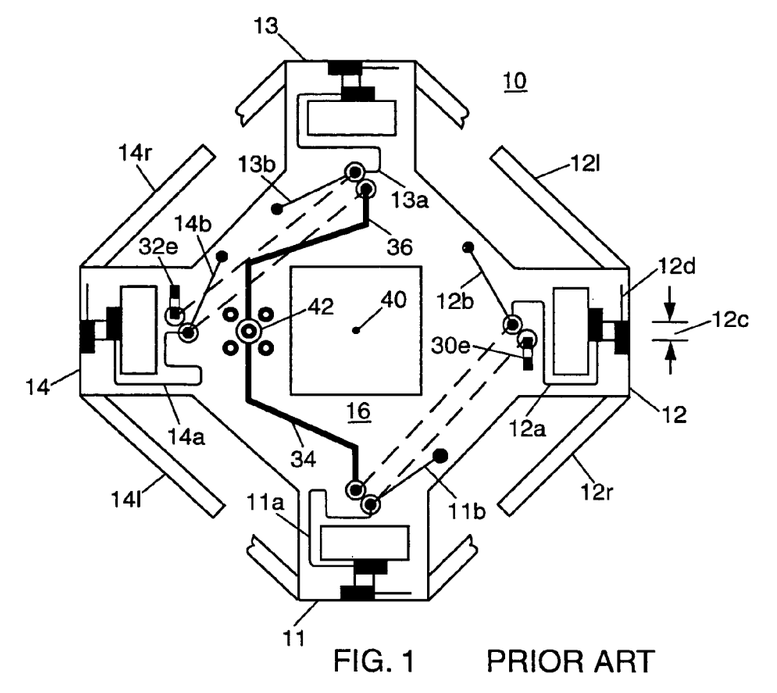
FIG. 1 is a top view of a four-dipole sub-array configuration usable in antennas pursuant to the invention (two dipoles are shown with partial arms for clarity of presentation).
Figure 2:
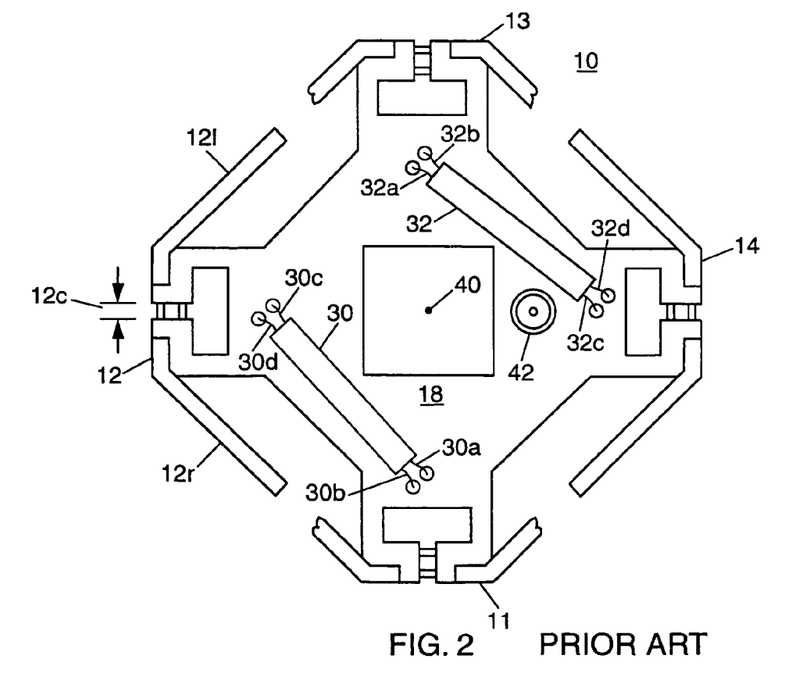
FIG. 2 is a bottom view of the FIG. 1 sub-array.
Figure 3:
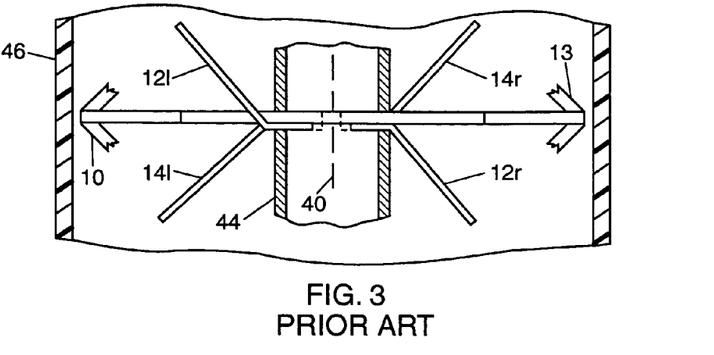
FIG. 3 is a side view of the FIG. 1 sub-array.
Figure 5:
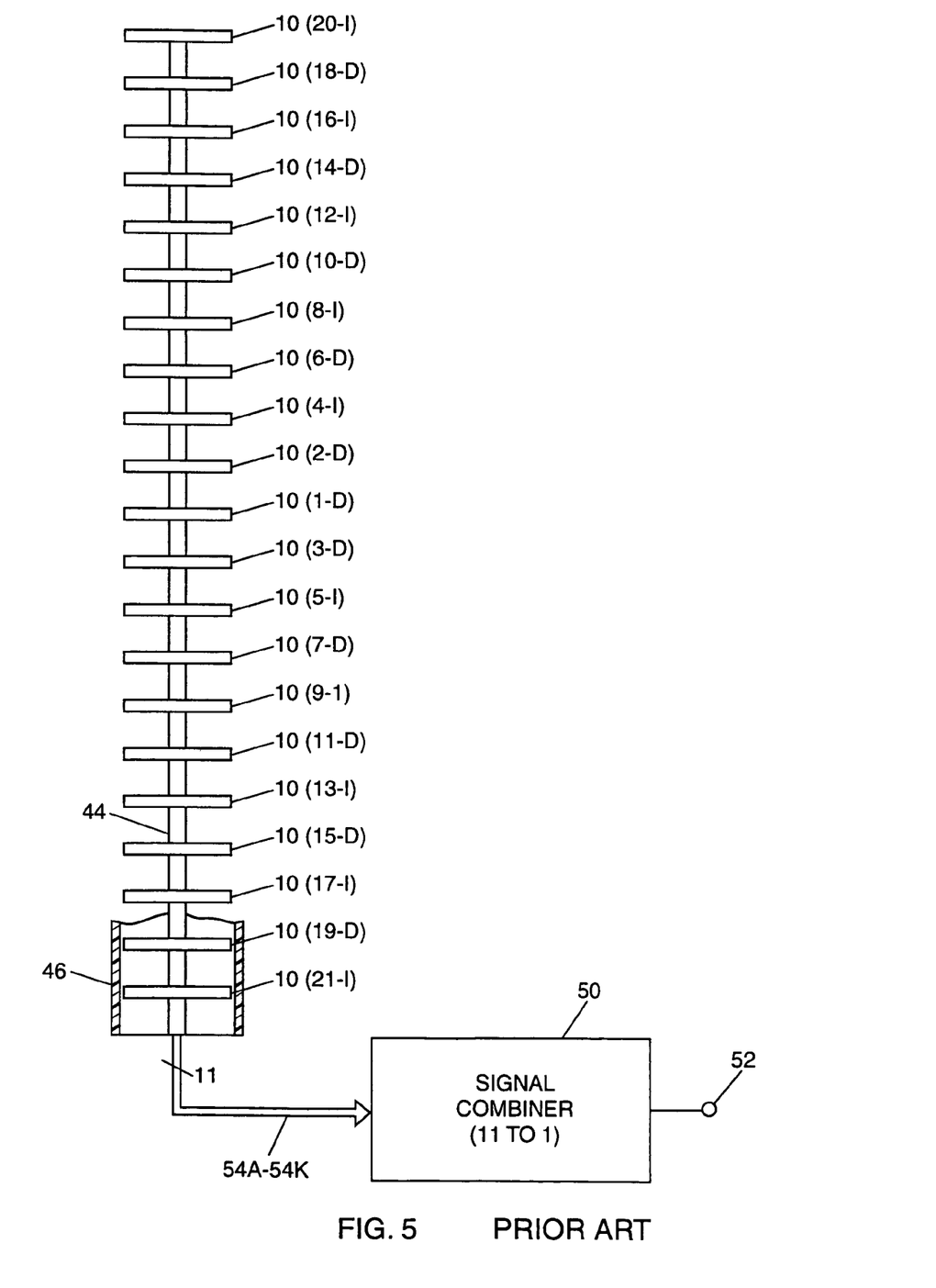
FIG. 5 illustrates a GPS antenna system including an array of 21 radiator units, each of which may be of the type shown in FIGS. 1, 2 and 3 and eleven of which are directly excited, with the remaining ten indirectly excited.

FIGS. 1, 2 and 3 are respective top, bottom and side views of a form of four-dipole sub-array usable in a GPS antenna system such as shown in FIG. 5. The FIG. 5 antenna system is configured to provide horizon (i.e., zero degrees) to Zenith (i.e., 90 degrees) elevation coverage, with omnidirectional azimuth coverage, for reception of circularly polarized signals.

FIG. 1 shows a four-dipole sub-array 10 including first, second, third and fourth dipoles 11, 12, 13, 14, respectively. Each dipole includes two opposed arms. The ends of the arms of dipoles 11 and 13, which would overlap arms of adjacent dipoles in this view, have been partially removed for clarity of illustration. In actual use, all four dipoles would typically be of substantially identical construction. This four-dipole configuration is shown and described in the '510 patent.

FIG. 1 illustrates an implementation using printed circuit techniques. In FIG. 1, conductor configurations are supported on the top surface of an insulative layer or substrate 16. The bottom view of FIG. 2, shows the bottom surface of a conductive (e.g., copper) layer 18 adhered to substrate 16. In this embodiment, individual arms of the dipoles (e.g., arms 12l and 12r of second dipole 12) are separately fabricated and soldered or otherwise attached at appropriate positions to the conductive layer 18. At particular locations, circuit connections pass through openings in conductive layer 18 and substrate 16 to circuit portions above. At other locations circuit connections pass through substrate 16 from above to make conductive contact with layer 18, which represents ground potential. Sub-array 10 includes a square central cutout suitable to receive a square conductive member and other cutouts to be described.

As shown in the FIG. 3 side view of the FIG. 1 four-dipole sub-array, opposed arms 12l and 12r of dipole 12 extend respectively upward and downward at approximately 45 degrees diagonally to horizontal. Arms 14l and 14r of dipole 14, at the back of configuration 10 in the view of FIG. 3, are also visible. The four dipoles 11, 12, 13, 14 are successively spaced around a vertical axis 40, shown dashed in FIG. 3 and in end view in FIGS. 1 and 2. Dipole arms are labeled l and r, representing the left arm and right arm of a particular dipole when viewed from vertical axis 40 (i.e., viewed from a position above the top surface of element 10, looking outward from axis 40).

Four-dipole sub-array 10 includes a port illustrated as coaxial connector 42. Connector 42 is shown in FIGS. 2 and 3 with its outer conductor portion mounted to conductive layer 18 and its center conductor passing through layer 18 to the upper surface of substrate 16.

Sub-array 10 also includes a progressive-phase-omnidirectional (PPO) excitation network coupled between port 42 and dipoles 11, 12, 13, 14. As illustrated, the PPO network includes first and second quadrature couplers 30 and 32, respectively, as shown in FIG. 2 and first and second transmission line sections 34 and 36, respectively, as shown in FIG. 1. Couplers 30 and 32 in this embodiment are wireline quadrature couplers having an external encasement which is soldered or otherwise grounded to conductive layer 18. Each wireline device is a 3 dB coupler having four signal port conductors: input port "a"; output port "b" providing signals of the same phase as input signals; output port "c" providing signals of quadrature phase (i.e., 90 degree phase lag relative to input signals); and port "d" which is resistively terminated (e.g., 50 ohms to ground). While signal input terminology is used for convenience, it will be understood that the couplers operate reciprocally for the present signal reception application.

Considering both the bottom view of FIG. 2 and the top view of FIG. 1, it will be seen that port a conductor 30a of wireline coupler 30 is coupled through layers 18/16 and coupled to signal port 42 via line section 34. Port b conductor 30b is coupled through layers 18/16 and coupled to the left arm of first dipole 11, via conductor 11a, to provide first dipole excitation of a first phase. Conductor 11a and associated shorted stub 11b (connected to layer 18 through layer 16) are appropriately dimensioned to provide suitable impedance matching to the dipole using known design techniques. Similarly, port c conductor 30c is coupled to the left arm of second dipole 12 via conductor 12a to provide second dipole excitation of a quadrature phase (i.e., differing by 90 degrees). Port d conductor 30d passes through layers 18/16 and is terminated by a 50 ohm chip resistor 30e mounted on the surface of layer 16 and grounded to layer 18.

Second wireline quadrature coupler 32 is correspondingly coupled to third and fourth dipoles 13 and 14, however, in this case couplings are to the right arms of dipoles 13 and 14 (rather than to the left arms, as above). Thus, port a conductor 32a of coupler 32 is coupled to signal port 42 via second transmission line section 36. Port b conductor 32b (zero phase) is coupled to the right arm of third dipole 13, via conductor 13a, with the phase reversal from opposite-arm excitation (i.e., via right arm v. left arm above) resulting in third dipole excitation of a phase opposite (i.e., differing by 180 degrees) to the first phase excitation of first dipole 11 (e.g., 180 degrees lag). Port c conductor 32c (quadrature phase) is coupled to the right arm of fourth dipole 14, via conductor 14a, with the quadrature phase and phase reversal from opposite arm excitation resulting in fourth dipole excitation of a phase opposite to the second phase excitation of second dipole 12 (e.g., 180 degrees lag). Port d conductor 32d is resistively terminated via chip resistor 32e. Shorted stubs 12b, 13b, and 14b as shown are provided for dipoles 12, 13 and 14 as discussed above with reference to stub 11b.

During signal reception, this sub-array configuration is effective to provide at signal port 42 a signal representative of reception via a 360 degree PPO azimuth antenna pattern. Thus, the PPO network is effective to provide relative signal phasing of zero, −90, −180 and −270 degrees at first, second, third and fourth dipoles 11, 12, 13, 14, respectively, with received signals combined to provide the PPO signal at port 42. The four-dipole configuration 10 thus operates as a self-contained unit to provide this PPO capability.

For effective GPS operation, the four-dipole sub-array as configured in FIGS. 1-3 is double tuned for operation at two GPS frequencies of 1,572.42 MHZ and 1,227.6 MHZ. With reference to second dipole 12, double tuning is provided by a tuned circuit utilizing the inductance of a stub comprising gap 12c backed up by a rectangular opening in conductive layer 18, in combination with capacitive stub 12d connected to layer 18 and overlying a portion of dipole 12. Provision of this tuned circuit enables the dipole to be double tuned using known design techniques, to enable reception at both GPS signal frequencies.

By way of example, the four-dipole sub-array 10 may be fabricated as a self-contained unit using printed circuit techniques, with the dipole arms, wireline quadrature couplers and coaxial connector soldered in place. For GPS application, the sub-array 10 may have typical dimensions of approximately three and a quarter inches across and an inch and a quarter in height. The sub-array is shown slightly enlarged and some dimensions may be distorted for clarity of presentation. The square central opening is dimensioned for placement on a square conductive member 44 of hollow construction (e.g., a square aluminum vertical support or mast shown sectioned in FIG. 3) with electrical connection of ground layer 18 to the member 44.

Figure 4A:
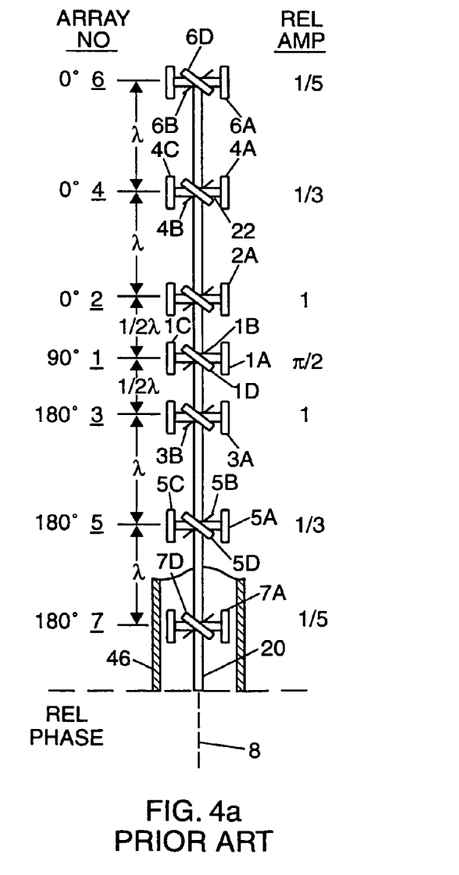
FIG. 4a and FIG. 4b illustrate an antenna system including an array of seven sub-arrays, each of which may be of the type shown in FIGS. 1, 2 and 3.

Reference is made to FIG. 4a which illustrates a form of antenna system described in U.S. Pat. No. 5,534,882 (the '882 patent). The FIG. 4a antenna system is arranged to provide a first circular polarization characteristic (e.g., right circular polarization) horizontally and upward from the horizon.

Figure 4B:
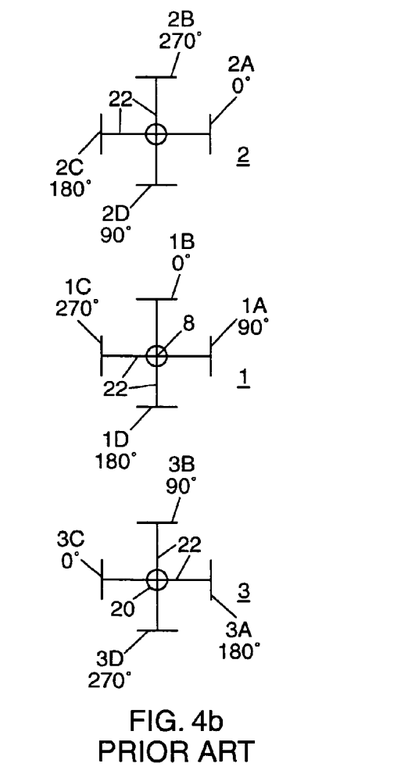

Referring to the FIG. 4a antenna system, a mast 20 supporting the antenna system is shown centered on the vertical axis 8 and normal to the horizontal plane. As illustrated, the antenna system includes a plurality of sub-arrays, shown as sub-arrays 1-7, spaced along mast 20. Considering sub-array 1, it consists of four dipoles each supported by coupling means illustrated as a base portion (such as shown at 22 with respect to dipole 1A) extending from mast 20. As shown for dipole 1D, each dipole is tilted so that its arm portions are at an angle of approximately 45 degrees. In FIG. 4a dipole 1D is in the front (permitting its tilted orientation to be seen), side dipoles 1A and 1C are seen in side profile and rear dipole 1B is shown in simplified form as a tilted line (to distinguish it from front dipole 1D). The A, B, C, D dipole labeling is typical for each of the other dipole arrays 2-7. The FIG. 4a antenna system looks the same when viewed from the front, the back or either side. Thus, except for the specific dipole labels as shown, FIG. 4a may be considered a front, back or side view. FIG. 4b shows simplified top views of sub-arrays 1, 2, and 3 of the FIG. 4a antenna, illustrating the symmetrical character of the four dipoles of each sub-array. As shown, the four dipoles of each sub-array are equally spaced around the mast 20 at 90 degree angular increments. The boresight of each dipole is thus aligned at an azimuth angle differing from the boresight angle of each other dipole in its sub-array by an integral multiple of 90 degrees.

In overview, it will thus be seen that each sub-array provides a PPO antenna pattern, however, the signal phasing at sub-arrays 2 and 3 have respectively been rotated forward (lead) and backward (lag) by 90 degrees relative to the signal phasing of sub-array 1.

As a result of excitation as described, with four 45 degree angled dipoles positioned symmetrically around mast 20 and supplied with signals as described, sub-array 1 will be effective to produce a right circular polarized radiation pattern around axis 12 which has a 360 degree PPO characteristics, as indicated by the relative phasing shown for dipoles 1A, 1B, 1C and 1D in FIG. 4b. Similarly, signals are coupled to the dipoles of the second sub-array of relative phase effective to produce a second PPO radiation pattern around axis 12 similar to the first such pattern, but which is shifted in azimuth by an angle of 90 degrees (i.e., 90 degrees phase lag) and to dipoles 3A, 3B, 3C and 3D to produce a similar 360 degree third PPO radiation pattern also shifted in azimuth relative to the first such pattern (i.e., 90 degrees phase lead). Additional sub-arrays (e.g., some or all of sub-arrays 4, 5, 6 and 7, plus additional similar arrays as suitable in particular applications) may be included and excited to provide appropriately aligned 360 degree circularly polarized PPO radiation patterns. Additional details as to the feed configuration, construction and operation of the FIG. 4a antenna system are provided in the '882 patent.

FIG. 5 illustrates a form of GPS antenna which utilizes a vertical array of radiator units in the form of four-dipole sub-arrays, including a four-dipole first sub-array 10 (1-D) and a plurality of additional identical sub-arrays, including ten upper sub-arrays positioned above first sub-array 10 (1-D) and ten lower sub-arrays positioned below first sub-array 10 (1-D). The sub-arrays are supported along rectangular mast 44 with vertical element-to-element spacings of approximately one-half wavelength at a frequency in the operating range. In this example, each of the sub-arrays may be identical to sub-array 10 of FIGS. 1-3. Each sub-array is identified with the reference numeral 10, indicating correspondence to sub-array 10 of FIGS. 1-3, and a parenthetical indicating the individual sub-array number and whether it is directly excited by connection to signal combiner 50 (e.g., sub-array 10 (4-D) is directly excited) or indirectly excited and not connected to signal combiner 50 (e.g., sub-array element 10 (6-I) is indirectly excited). As shown, the directly excited ten upper sub-arrays 10 (2-D), 10 (4-I), 10 (6-D), 10 (8-I), 10 (10-D), 10 (12-I), 10 (14-D), 10 (16-I), 10 (18-D) and 10 (20-I) positioned above first sub-array 10 (1-D) all have individual sub-array numbers which are even and indirectly excited sub-arrays are in alternating positions each adjacent to at least one directly excited sub-array. Also, the ten lower sub-arrays 10 (3-D), 10 (5-I), 10 (7-D), 10 (9-I), 10 (11-D), 10 (13-I), 10 (15-D), 10 (17-I), 10 (19-D), and 10 (21-I) positioned below first sub-array 10 (1-D) all have individual sub-array numbers which are odd and indirectly excited sub-arrays are in alternating positions with directly excited sub-arrays.

Although sub-arrays are described in terms of being directly or indirectly "excited", it will be understood the FIG. 5 antenna is intended for reception of GPS satellite signals. As represented in FIG. 5, received signals are provided to signal combiner 50 by eleven signal paths 54A-54K (e.g., coaxial cables). Each of cables 54A-54K, which are typically of equal length, connects to the signal port (e.g., connector 42 of the FIG. 1 sub-array) of one of the eleven directly excited sub-arrays. In this embodiment there are no cable connections to the ten indirectly excited sub-arrays, the signal ports of which may be suitable terminated. To provide the desired antenna pattern as discussed above with reference to the FIG. 4a antenna system, signal combiner 50 is arranged to: provide reference phase signals to the first sub-array (sub-array 10

(1-D) the center sub-array); provide to each of the directly excited upper sub-arrays signals which lag that reference phase by 90 degrees; and provide to each of the directly excited lower sub-arrays signals which lead by 90 degrees. As an alternative, it will be apparent that the desired PPO excitations which lead and lag by 90 degree phase differentials can be provided by permanently rotating selected sub-arrays by 90 degrees in azimuth and coupling of reference or some phase signals to each of the eleven directly excited sub-arrays. Thus, for this alternative configuration all of the upper sub-arrays above first sub-array 10 (1-D) can be placed on the square mast 44 in a physical alignment rotated forward (clockwise, looking down from above) one quarter turn or 90 degrees, relative to the first sub-array. Similarly, all of the lower sub-arrays can be placed on the square mast 44 in a physical alignment rotated backward one quarter turn or 90 degrees, relative to the first sub-array 10 (1-D). The FIG. 5 antenna and its operation are more fully described in the '510 patent.

In particular applications, the antenna of FIG. 5 may include different numbers of sub-arrays of the directly and indirectly excited types, as determined by skilled persons in view of the desired operational performance. The FIG. 5 antenna has been determined to provide 30 dB of suppression of reflected GPS signals, as a result of its sharp radiation pattern cut off for signals incident at below horizon angles.

Figure 6:
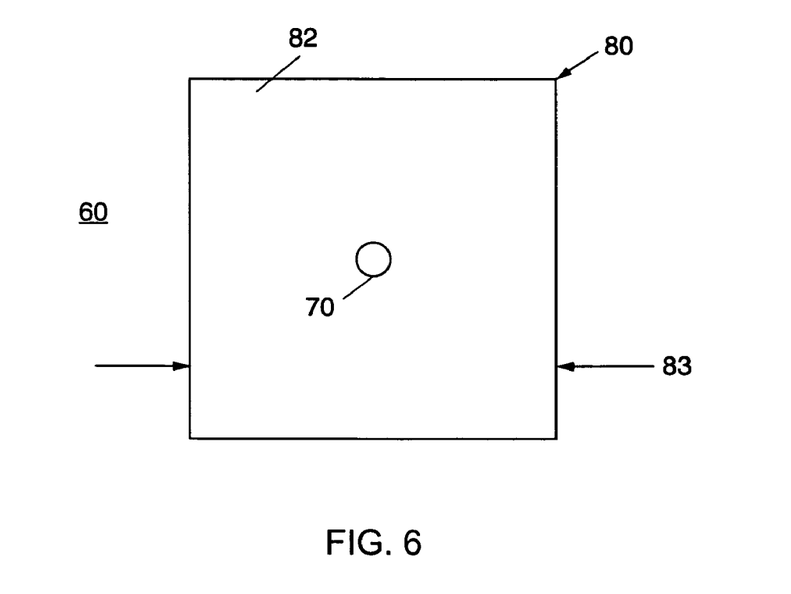
FIGS. 6 and 7 are plan and side representations of an embodiment of an integrity monitor antenna system utilizing the invention.
Figure 7:
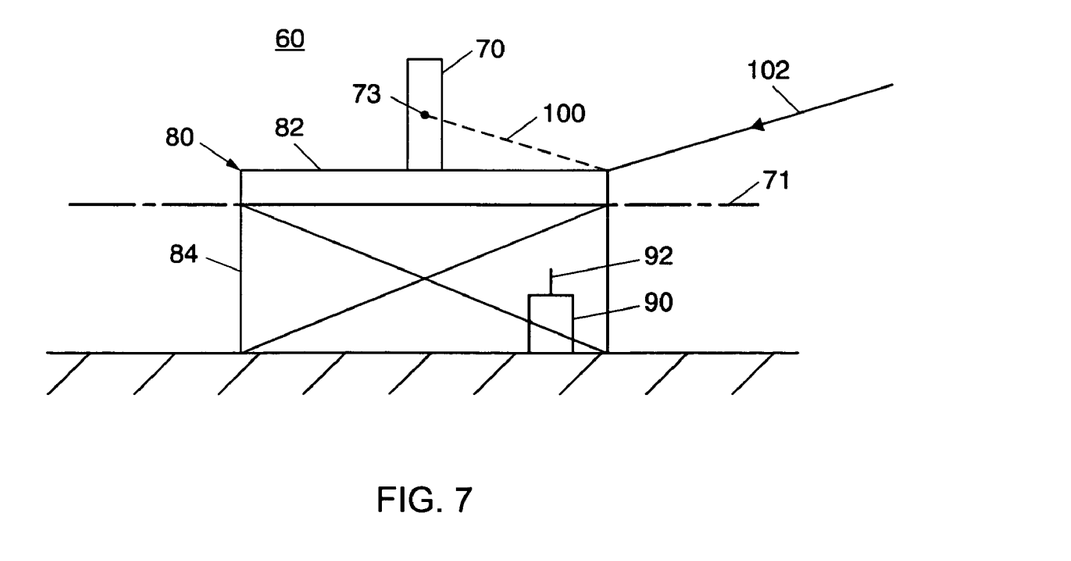

FIGS. 6 and 7 are top and side views of an embodiment of an integrity monitor antenna system 60 pursuant to the invention. Antenna system 60 is usable for verification of the operational integrity of GPS-based aircraft precision approach and landing systems, and consistent with such application may be configured to provide extreme ground multipath mitigation (i.e., may provide up to 50 dB suppression of GPS multipath signals).

As illustrated, antenna system 60 includes an antenna 70 configured to provide a right-hand circular polarization antenna pattern above a horizontal plane (such plane is represented at 71 in FIG. 6). In a presently preferred embodiment, antenna 70 may comprise the antenna of the form of FIG. 5 (including the cylindrical radome 46) as described above or modifications thereof as may be provided by skilled persons as suitable for particular applications. As described above with reference to FIG. 5, antenna 70 employs a vertical array of sub-arrays each having a 360 degree progressive phase radiation characteristic, with directly excited sub-arrays interspersed with indirectly excited sub-arrays. With the FIG. 5 configuration, antenna 70 operationally provides a 30 dB up/down gain ratio, thereby providing 30 dB of suppression of GPS multipath signals. A characteristic of the FIG. 5 antenna is a well-defined unitary signal phase center positioned about one meter above the base of the antenna, as represented at 73 in FIG. 6.

The integrity monitor antenna system of FIGS. 6 and 7 further includes a multipath limiting configuration 80 comprising a bed portion 82 and a support structure 84. Bed portion 82, positioned on a horizontal plane represented at 71 below the antenna 70, has a signal absorbent characteristic effective to provide attenuation of incident GPS signals (e.g., 20 dB attenuation of signals incident on its surface). In this embodiment, bed portion 82 has a minimum dimension 83 along plane 71 of 20 feet, which is adequate to intersect a ray path from phase center 73 representative of a multipath signal incident at an elevation angle of minus 20 degrees. As will be discussed further, it follows from this that any multipath signal incident at a negative angle greater than minus 20 degrees (e.g., minus 30 degrees, minus 45 degrees, etc.) would similarly be attenuated before reflection to the phase center 73. For present purposes, the words suppression and attenuation are used in the sense of reduction of the level or effect of a signal.

Multipath limiting configuration 80 also includes support structure 84 supporting the antenna 70 and bed portion 82 at a height above ground surface adequate to result in shadowing by bed portion 82 of multipath reflections from surface vehicles, such as local maintenance vehicles, and other possible items which may be present in the relatively near vicinity of the antenna system on a transient or other basis. In this embodiment, support structure 84 has a height of approximately 11 feet, so as to support the top surface of bed portion 82 at a height of 12 feet above the surface of the ground. In this regard, it should be noted that the most relevant multipath reflections to be blocked are those reflected from surface vehicles (e.g., a maintenance vehicle) which could be parked or driven to a position closer than about 30 feet from the antenna system 60. It has been determined that multipath reflections from vehicles which are farther than about 30 feet from the antenna can be assumed to have a maximum potential signal strength upon reaching phase center 73 of the antenna such that those reflections will not result in any significant multipath error in derivation of a GPS-indicated position via the antenna system.

The integrity monitor antenna system of FIGS. 6 and 7 additionally includes receiver/processor 90 illustrated in FIG. 7 as an equipment enclosure 90 positioned at ground level within support structure 84 and including a top-mounted VHF receiving antenna 92. Receiver/processor 90 is coupled (e.g., via a cable not shown) to antenna 70 and is configured to process received GPS signals to derive position error data representing differentials between the fixed location of the antenna system 60 (the latitude, longitude and altitude of such position having previously been accurately determined) and a GPS-indicated location of antenna 70 determined based on signals currently received from a subset of GPS satellites. Such position error data, representing errors or error levels inherent in the currently derived GPS-indicated location, may be configured to be usable onboard an aircraft to represent error levels in the aircraft location in space as determined from GPS signals received by the aircraft during approach and landing operations at an airport adjacent to the location of antenna system 60. Such usage of the error data may include indications of the possible magnitude of current positional errors or the activation of warning signals, sounds or flags, when the current error levels make reliance upon guidance from a GPS-based landing system for landing the aircraft potentially unsafe or dangerous (e.g., under zero visibility conditions).

A GPS-based aircraft precision landing system may utilize a plurality of standardized antennas at accurately known positions adjacent to a runway in order to receive current GPS signals and derive GPS correction data which is transmitted to approaching aircraft to enable corrections to the aircraft position in space as actively derived from GPS signals. Thus, current atmospheric and other conditions could result in onboard equipment deriving an aircraft position in space which is subject to relatively large errors in altitude, as one example. Use of the GPS correction data received from the landing system with reliance on those standardized antennas would ideally permit the equipment onboard the aircraft to correct that altitude error and enable a safe landing.

However, the performance of one or more of those standardized antennas used by the landing system may at any time be adversely affected (i.e., degraded) by the presence of reflected multipath signals, with the potential result that the correction signals provided to the aircraft by the landing system could themselves be inaccurate (e.g., representative of an error of 6-10 cm. in altitude or laterally). Thus, the operating integrity of the landing system intended to insure the accuracy of GPS assisted landings may itself be compromised by multipath signals affecting reception via the standardized antennas. To address this problem, integrity monitor antenna system 60 may be arranged to receive from the landing system the same GPS correction signals the landing system transmits or would transmit to aircraft. Thus, antenna 92 in FIG. 7 may be a small VHF antenna to receive from the landing system and couple to receiver/processor 90 signals carrying GPS correction data, representing errors in GPS-indicated position data, as derived by the landing system (via the standardized antennas) for use by aircraft. Receiver/processor 90 may be configured to first receive via antenna 70 GPS signals from a sub-set of GPS satellites, then to derive position error data as discussed above, then to compare that error data with GPS correction data received from the landing system, and finally to send position error data including the results of that comparison by land cable back to the landing system. In this way, the landing system receives results indicating the level of error (as determined via antenna system 60, which is much less subject to multipath induced error than the standardized landing system antennas) in the GPS correction data the landing system is transmitting or would transmit to aircraft. With information on that level of error, the landing system may use such information to determine that its GPS correction data has the required integrity, to broadcast warning flags or messages to aircraft, or to take other suitable action. Thus, error data from the antenna system 60 is usable by the GPS-based precision approach and landing system for system verification.

In other implementations, position error data derived by receiver/processor 90 may be transmitted directly to an approaching aircraft, instead of to the landing system as described. In this case, a signal processor onboard the aircraft may be arranged to utilize the received error data to generate warnings, when appropriate, regarding the accuracy of a GPS-indicated location in space of the aircraft (as derived onboard the aircraft).

Consistent with the preceding, in a currently preferred implementation receiver/processor 90 employs the same signal processing as employed in the signal processor utilized in aircraft using the landing system (e.g., the same circuitry or comparable circuitry employing the same processing and the same or equivalent VHF antenna). In this way the GPS-indicated location derived by antenna system 60 will be directly comparable to GPS-indicated locations derived onboard approaching aircraft. It is possible that different levels of error may concurrently be associated with GPS indicated locations derived by use of different subsets (e.g., groups of three) of GPS satellites. In a currently preferred implementation receiver/processor 90 is configured to identify the individual satellites of the subset of GPS satellites currently being utilized for location determinations and provide such information to the landing system to permit the landing system to communicate with equipment onboard the aircraft to ensure that the aircraft, the landing system and antenna system 60 are all operating on the basis of the same signals in space received from the same identified subset of GPS satellites. This would obviate aircraft reliance on signals from a different GPS satellite whose signals in space have not been subject to error determinations by antenna system 60.

As already noted, antenna 70 may have the form of the FIG. 5 antenna. Bed portion 82 in a currently preferred embodiment comprises an approximately 12 inch thick layer of foam material (e.g., of adjacent two foot square units) having a signal absorption characteristic, comparable to such material commonly used in anechoic chambers designed for antenna test purposes. A suitable protective layer, of plastic sheeting or other suitable construction, may be employed to cover and protect such foam material from atmospheric and other conditions. With such construction, bed portion 82 may be configured to provide 20 dB attenuation of incident signals or, more generally, nominally 20 dB attenuation, where nominally is defined as within plus or minus ten percent of a stated value. Support structure 84 may comprise a steel tower type of construction mounted on a concrete ground pad, or other suitable arrangement configured to provide stable support for the other antenna system elements. Receiver/processor unit 90 may comprise a suitable weather-protective electronic equipment enclosure enclosing electronic circuitry and other components suitable for implementing the described functions using known signal processing and other techniques. Fiber optic or other cabling, buried or otherwise, may be used between the antenna system and the landing system. Such cabling is well known and is not illustrated.

As discussed, antenna system 60 implemented as described is capable of providing up to 50 dB of suppression of incident reflected multipath signals. Under all typical operating conditions, antenna system 60 provides the capability of limiting the peak multipath based error level to the order of 1 cm. in altitude or lateral distance, enabling highly accurate GPS positioning for determining the landing system integrity level and generating warnings if required. In this context, antenna system 60 provides a stable unitary phase center of accurately determined position, to enable precision determinations of phase of received signals and avoid introduction of phase discrepancies.

Figure 8:
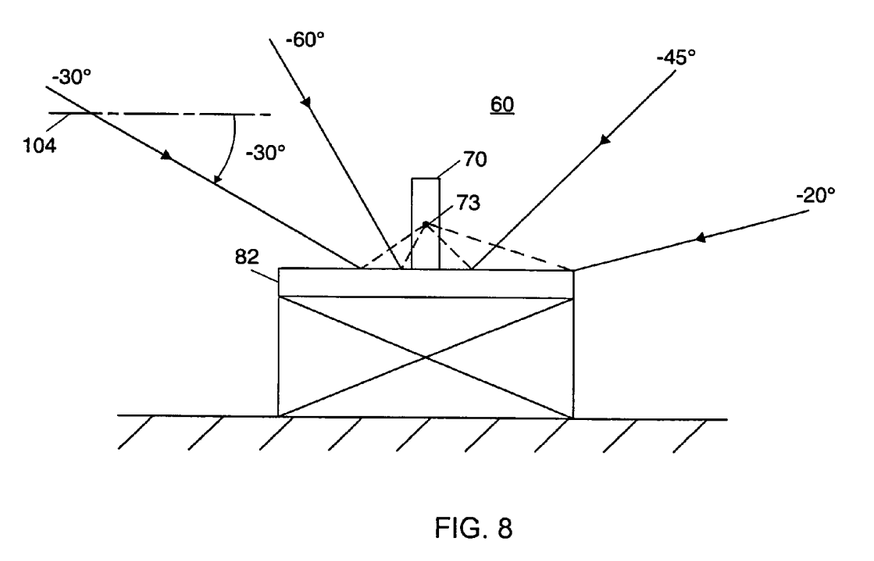
FIGS. 8 and 9 illustrate incidence angles of reflected GPS multipath signals for descriptive purposes.

Referring now to FIG. 8, it is illustrated that with bed portion 82 having a horizontal dimension of 20 feet and antenna 70 having a signal phase center one meter above bed portion 82, bed portion 82 will be effective to absorb a predetermined portion (e.g., 20 dB attenuation) of multipath signals incident at any negative angle greater than minus 20 degrees, prior to such signals being received (i.e., approaching the phase center 73). Thus, as represented in FIG. 7, bed portion 82 has a dimension horizontally (along plane 71) which is adequate to intersect a ray path 100 from the phase center 73 which is representative of a multipath signal 102 incident at a negative elevation angle of minus 20 degrees. As illustrated in FIG. 7, a GPS satellite signal 102 is reflected from bed portion 82 as an attenuated multipath signal, shown dashed to represent the attenuation. Thus, it will be seen that ray path 100 from phase center 73 is representative of a signal 102 incident on bed portion 82 at a negative angle of minus 20 degrees. As will be seen from FIG. 8, if bed portion 82 has a horizontal dimension adequate to intersect a ray path representative of a multipath signal incident at minus 20 degrees, that horizontal dimension will also be adequate to intersect multipath signals incident at negative elevation angles that are greater than minus 20 degrees, e.g., at negative angles of minus 30, 45, 60 degrees, etc. For clarity, in FIG. 8 a negative angle of minus 30 degrees is illustrated as extending at an angle of 30 degrees below a horizontal plane 104. Signals at lower negative angles (less than minus 20 degrees) cannot be expected to be incident directly from the GPS satellites at signal levels adequate to cause significant multipath errors for present purposes.

Figure 9:
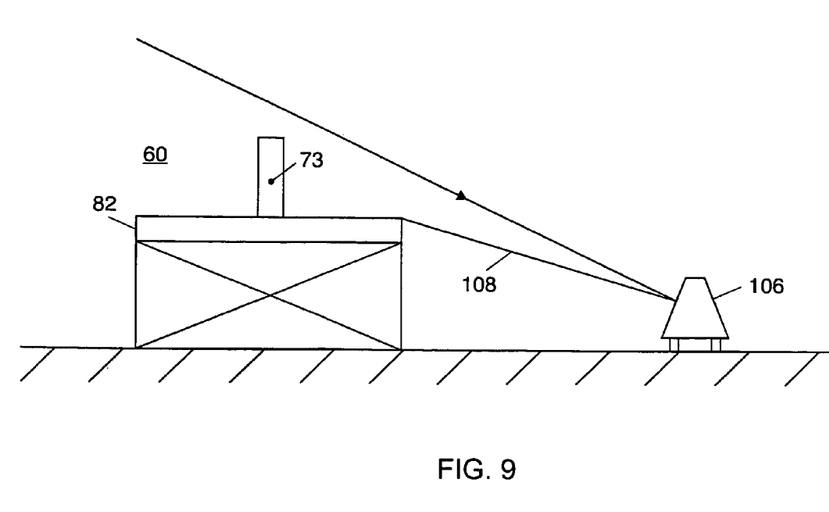

Multipath GPS signals may also result from reflections of satellite signals from surface vehicles (e.g., maintenance vehicles parked near the antenna system). In selecting a site near a runway for installation of antenna system 60 the presence of fixed objects presenting reflecting surfaces (e.g., buildings, sheds, etc.) must be carefully analyzed, so that there are no such large surfaces close enough to the antenna site to potentially reflect signals of significant strength at the phase center of the antenna. Having addressed and taken action to avoid such reflections from fixed objects, there remains the potential problem of significant reflections from maintenance vehicles, as may be employed by technicians servicing the antenna system. While there may be a low probability that a car or truck will present a significant reflecting surface at just the right orientation and angle to aim a reflected GPS satellite signal directly at the phase center 73 of antenna 70, nevertheless, the bed portion 82 of the antenna system is raised above ground surface to provide suppression by shadowing such reflected multipath signals. By analysis, it has been determined that a potential for a multipath reflection from a vehicle of a signal strength which will be significant for present purposes may exist if such a vehicle is closer to the antenna than about 30 feet. For example, as illustrated in FIG. 9, for such a reflection 108 from a vehicle 106 the reflected multipath signal will be shadowed (i.e., blocked) by the bed portion 82 and prevented from reaching the phase center 73 of the antenna 70. In this embodiment, support structure 84 supports bed portion 82 at a height of about 11 feet, so that the top surface of bed portion 82 is about 12 feet above ground surface to provide such shadowing of multipath reflections from ground elements. Thus, while such reflections from vehicles at 30 feet or less from the antenna will be blocked from reaching the phase center 73, reflections from a vehicle located further away would not be blocked and could reach the phase center. However, even if such vehicle presented the equivalent of a 4 foot by 4 foot flat surface at just the right orientation and angle, the potential for a resulting significant multipath error would not be presented.

While there have been described currently preferred embodiments of the invention, those skilled in the art will recognize that other and further modifications may be made without departing from the invention and it is intended to claim all modifications and variations as fall within the scope of the invention.

What is claimed is:

1. An integrity monitor antenna system, with enhanced multipath mitigation, usable for GPS-based aircraft precision landing system verification, comprising:
    an antenna configured to provide a right-hand circular polarization antenna pattern above a horizontal plane and having a phase center above said plane;
    a multipath limiting configuration including a bed portion positioned on said plane below said antenna and having a signal absorbent characteristic effective to provide attenuation of incident signals, said bed portion having a minimum dimension along said plane adequate to intersect ray paths from said phase center representative of multipath signals incident at negative elevation angles of minus 30 degrees or greater, and said configuration positioned at a fixed location of known latitude, longitude and altitude;
    a receiver/processor coupled to said antenna and configured to process received GPS signals to derive position error data representing differentials between said fixed location and a GPS-indicated location of said antenna based on signals currently received from a subset of GPS satellites, said position error data configured to be usable to derive error levels relative to aircraft location in space determinations based on GPS signals received during landing operations.

2. An integrity monitor antenna system as in claim 1, wherein said receiver/processor is additionally configured to include with said position error data identification of individual GPS satellites included in said subset of GPS satellites.

3. An integrity monitor antenna system as in claim 1, wherein said receiver/processor comprises GPS signal processing the same as GPS signal processing utilized onboard aircraft using the landing system.

4. An integrity monitor system as in claim 1, wherein said receiver/processor is additionally configured to receive GPS correction data from said landing system, utilize said GPS correction data in deriving said position error data, and send said position error data to said landing system for purposes of verification of GPS correction data transmitted by the landing system to landing aircraft.

5. An integrity monitor antenna system as in claim 1, wherein said bed portion has a minimum dimension along said plane of nominally 20 feet and provides nominally 20 dB attenuation of signals incident upon said bed portion.

6. An integrity monitor antenna system as in claim 1, wherein said bed portion has a minimum dimension along said plane adequate to intersect ray paths from said phase center representative of multipath signals incident at negative elevation angles of minus 20 degrees or greater.

7. An integrity monitor antenna system as in claim 1, wherein said multipath limiting configuration includes a support structure supporting said antenna and said bed portion at a height above ground surface adequate to provide shadowing by said bed portion of multipath reflections from surface vehicles closer than 30 feet from said antenna.

8. An integrity monitor antenna system as in claim 1, wherein said multipath limiting configuration includes a support structure supporting said antenna and said bed portion at a height of at least 10 feet above ground surface to provide shadowing by said bed portion of multipath reflections from surface vehicles.

9. An integrity monitor antenna system as in claim 1, wherein said antenna system is configured to provide nominally 50 dB suppression of reflected GPS multipath signals incident upon said bed portion.

10. An integrity monitor antenna system, with enhanced multipath mitigation, usable for GPS-based aircraft precision landing system verification, comprising:
    an antenna including a vertical array of sub-arrays each having a 360 degree progressive phase radiation characteristic, said antenna configured to provide a right-hand circular polarization antenna pattern above a horizontal plane and having a phase center above said plane; and
    a multipath limiting configuration including a bed portion positioned on said plane below said antenna and having a signal absorbent characteristic effective to provide attenuation of incident signals, said bed portion having a minimum dimension along said plane of at least 10 feet to intersect ray paths from said phase center representative of multipath signals incident at negative elevation angles of minus 30 degrees or greater, said configuration including a support structure supporting said antenna and said bed portion at a height above ground surface adequate to provide shadowing by said bed portion of multipath reflections from surface vehicles closer than nominally 30 feet from said antenna, and said configuration positioned at a fixed location of known latitude, longitude and altitude;
    said antenna system configured to provide at least 40 dB suppression of reflected GPS multipath signals incident upon said bed portion.

11. An integrity monitor antenna system as in claim 10, wherein said antenna system additionally comprises a receiver/processor coupled to said antenna and configured to process received GPS signals to derive position error data representing differentials between said fixed location and a GPS-indicated location of said antenna based on signals currently received from a subset of GPS satellites, said position error data configured to be usable to derive error levels relative to aircraft location in space determinations based on GPS signals received during landing operations.

12. An integrity monitor antenna system as in claim 11, wherein said receiver/processor is additionally configured to include with said error data identification of individual GPS satellites included in said subset of GPS satellites.

13. An integrity monitor antenna system as in claim 11, wherein said receiver/processor is additionally configured to receive GPS correction signals from said landing system, utilize said GPS correction signals in deriving said position error data, and send said position error data to said landing system for purposes of verification of GPS correction data transmitted by the landing system to landing aircraft.

14. An integrity monitor antenna system as in claim 10, wherein said bed portion has a signal absorbent characteristic effective to provide nominally 20 dB attenuation of reflected GPS multipath signals incident upon said bed portion and said bed portion has a minimum dimension along said plane of nominally 20 feet to intersect ray paths from said phase center representative of multipath signals incident at negative elevation angles of minus 20 degrees or greater.

15. An antenna system, with enhanced multipath mitigation, usable for GPS-based aircraft precision landing system verification, comprising:
   an antenna, for reception of satellite signals, configured to provide a right-hand circular polarization antenna pattern above a horizontal plane and having a phase center above said plane; and
   a multipath limiting configuration including a bed portion positioned on said plane below said antenna and having a signal absorbent characteristic effective to provide attenuation of incident signals, said bed portion having a minimum dimension along said plane adequate to intersect a ray path from said phase center representative of a multipath signal incident at negative elevation angles of minus 30 degrees or greater, said configuration including a support structure supporting said antenna and said bed portion at a height above ground surface to provide predetermined shadowing by said bed portion of multipath reflections of satellite signals and said configuration positioned at a location of known latitude, longitude and altitude.

16. An antenna system as in claim 15, wherein said bed portion has a minimum dimension along said plane adequate to intersect ray paths from said phase center representative of multipath signals incident at an elevation angle of minus 20 degrees or greater.

17. An antenna system as in claim 15, wherein said bed portion has a minimum dimension along said plane of nominally 20 feet.

18. An antenna system as in claim 15, wherein said bed portion has a signal absorbent characteristic effective to provide nominally 20 dB attenuation of reflected GPS multipath signals incident upon said bed portion.

19. An antenna system as in claim 15, wherein said antenna includes a vertical array of sub-arrays each having a 360 degree progressive phase characteristic.

20. An antenna system as in claim 15, wherein said support structure supports said antenna and said bed portion at a height of at least 10 feet above ground surface.

* * * * *